United States Patent [19]

Hector et al.

[11] 4,421,317
[45] Dec. 20, 1983

[54] ELECTRONIC GAME APPARATUS USING A THREE-DIMENSIONAL IMAGE

[75] Inventors: Roger D. Hector, San Jose; Harry H. Jenkins, Jr., Menlo Park, both of Calif.

[73] Assignee: Atari, Inc., Sunnyvale, Calif.

[21] Appl. No.: 222,839

[22] Filed: Jan. 6, 1981

[51] Int. Cl.³ .............................................. A63F 9/00
[52] U.S. Cl. ..................................... 273/313; 40/575
[58] Field of Search ................ 273/1 GC, 1 E, 85 G,
273/88, 94, 237, 238, 313–315; 434/25, 26, 29;
340/378.1–378.4, 705; 352/72, 74–76; 40/427,
550–552, 564, 575, 577, 615

[56] References Cited

U.S. PATENT DOCUMENTS

| | | | |
|---|---|---|---|
| 3,560,921 | 2/1971 | Lopez | 350/3.85 |
| 3,790,172 | 1/1974 | Nakamura | 273/313 |
| 4,190,832 | 2/1980 | Mohler | 340/705 |
| 4,306,768 | 12/1981 | Egging | 350/174 |
| 4,317,610 | 3/1982 | Breglia | 350/3.77 |
| 4,345,764 | 8/1982 | Barlow et al. | 273/313 |

OTHER PUBLICATIONS

Stephen D. Bristow, "*History of Video Games*" Feb. 1977, I.E.E.E. Transactions on Consumer Electronics, pp. 58–68.
Amazing Optics will Enhance Coin-Op Games by Mary Claire Blakeman/Playmeter, Dec. 1980.

*Primary Examiner*—Vance Y. Hum
*Assistant Examiner*—Leo P. Picard
*Attorney, Agent, or Firm*—Townsend & Townsend

[57] ABSTRACT

An electronic game includes a base having an opening; at least one three-dimensional image stored on a plate, typically a hologram; a light source for each image; a microcomputer; and player controls. Illumination of the plate by the light source projects a three-dimensional image seen during play of the game. In some versions light emitting diodes are provided to supplement the three-dimensional image being displayed.

39 Claims, 9 Drawing Figures

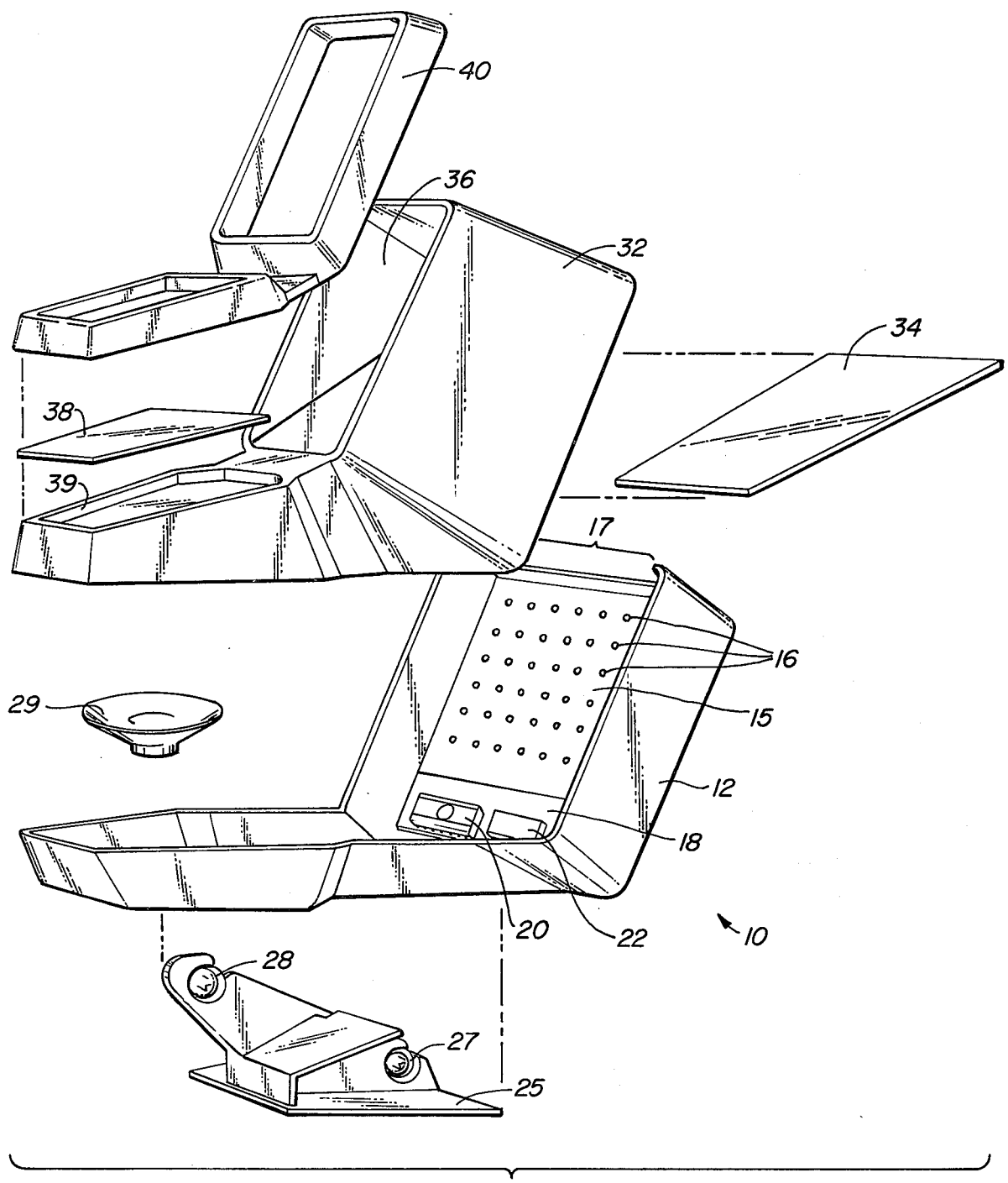
FIG._1.

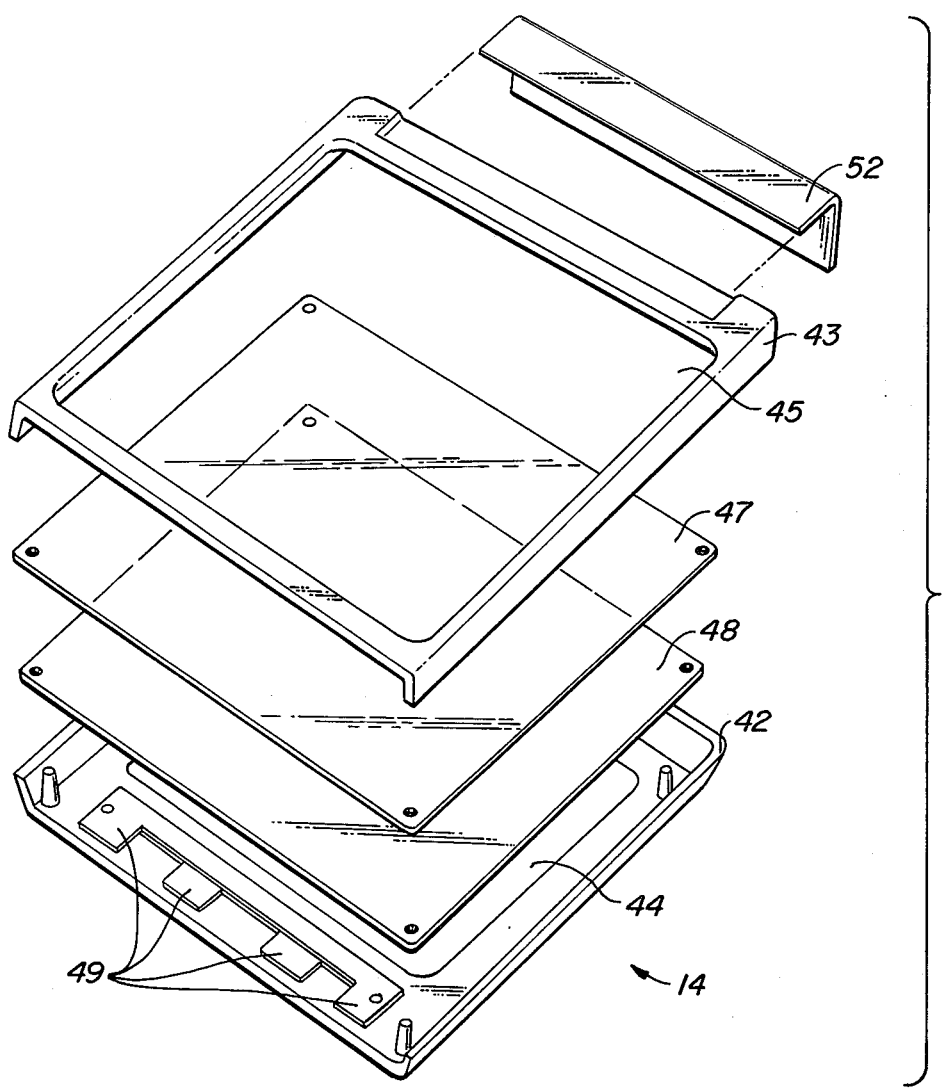
FIG._2.
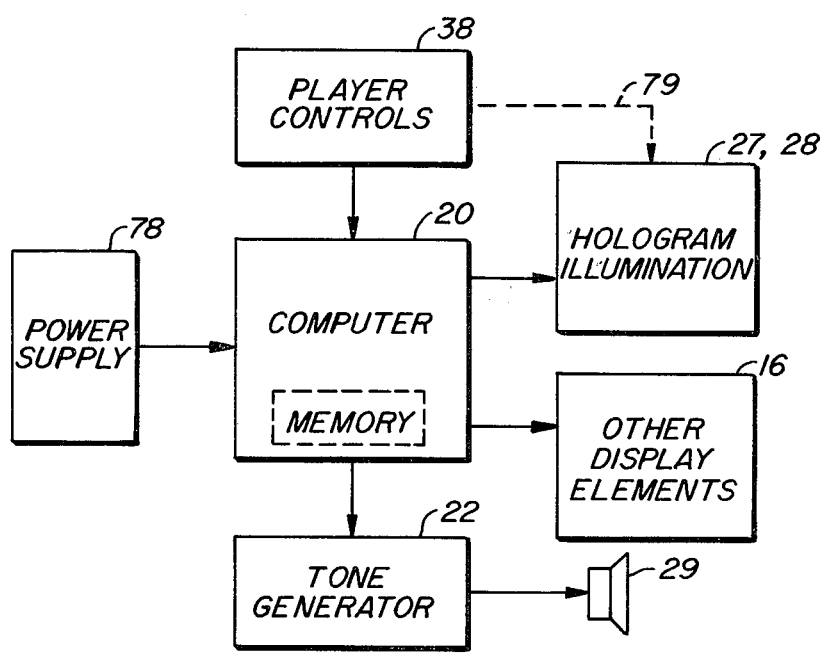
FIG._9.

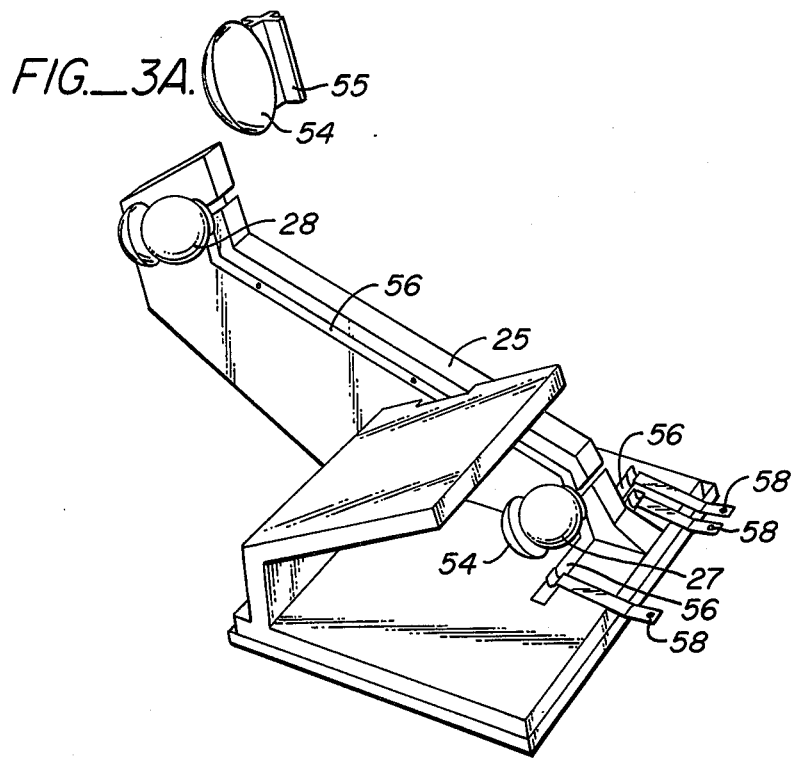
FIG._3A.
FIG._3.
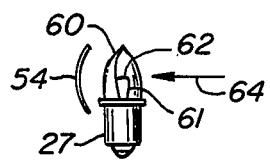
FIG._4A.
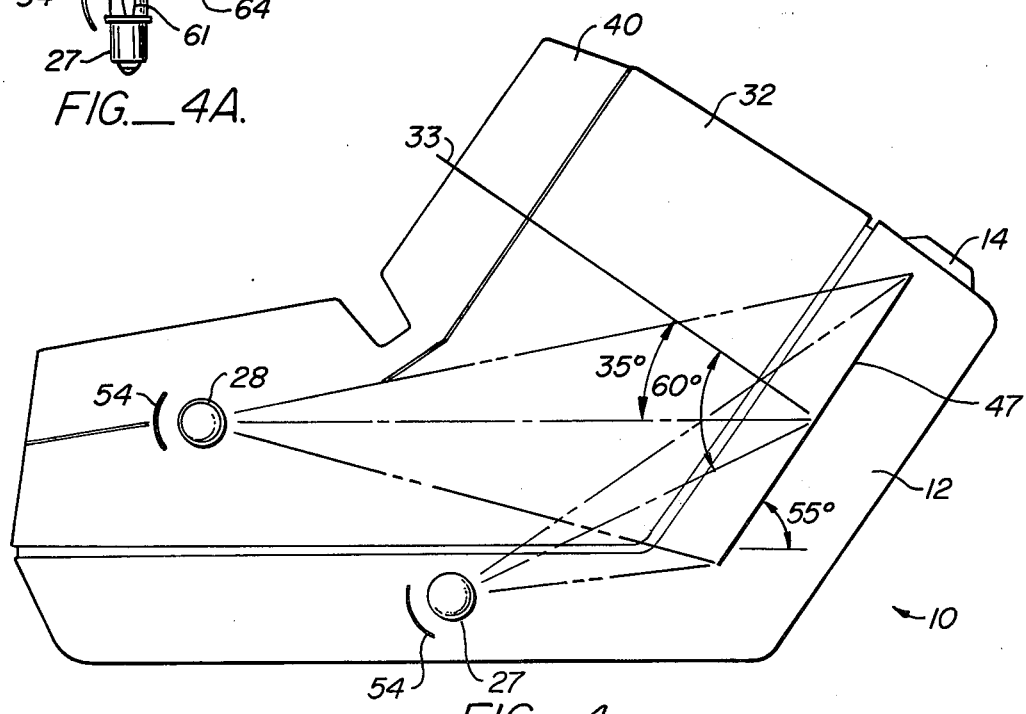
FIG._4.

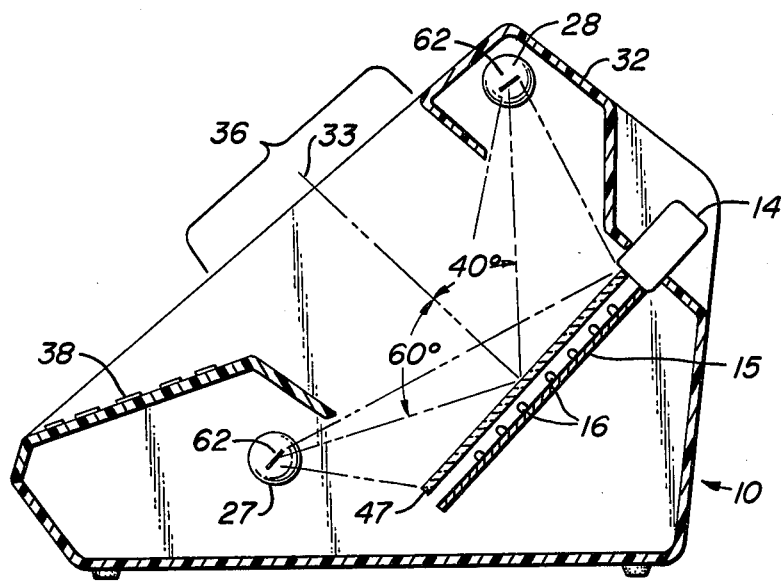
FIG._5.
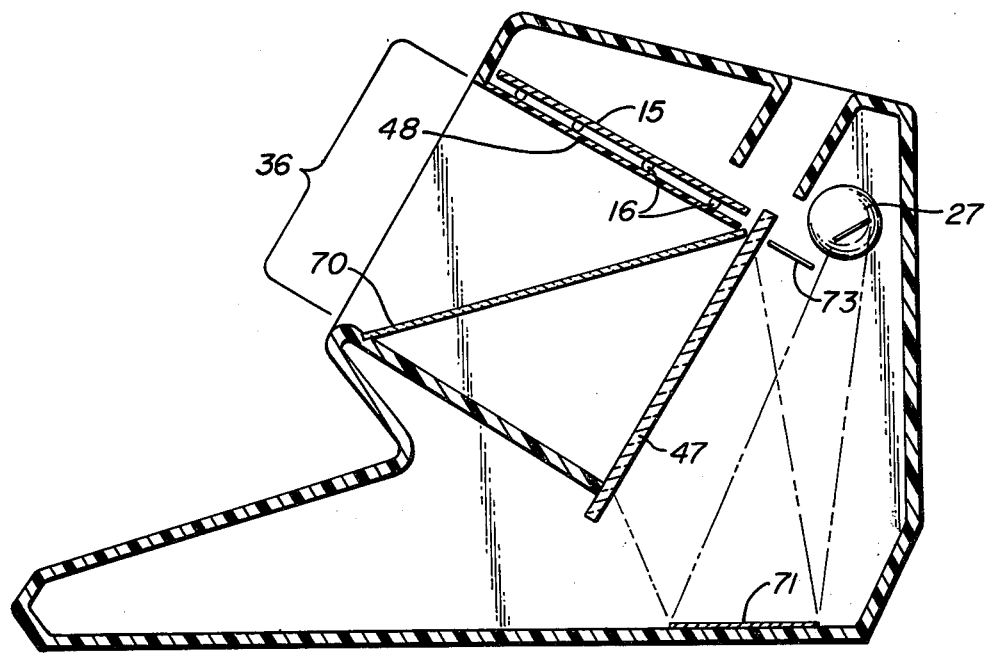
FIG._6.

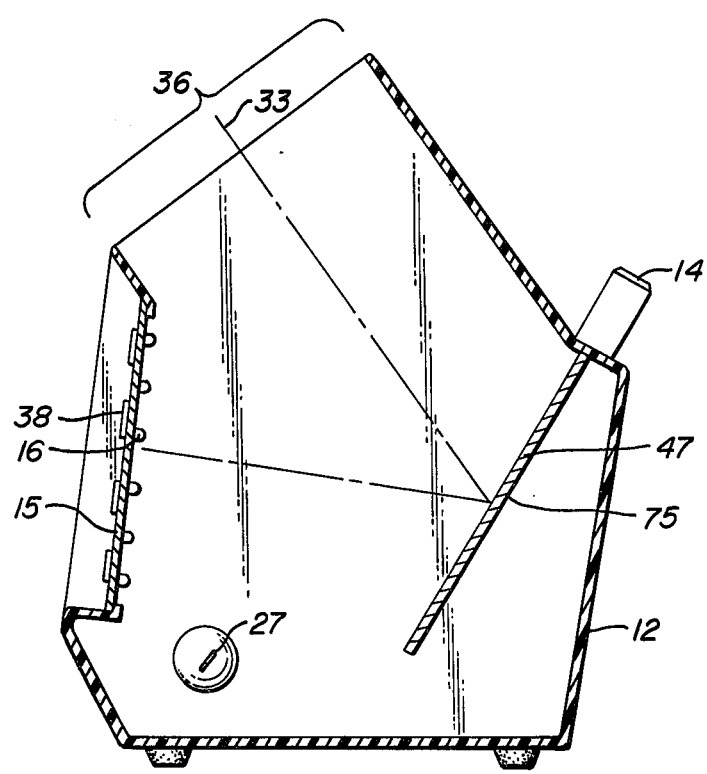
FIG._7.
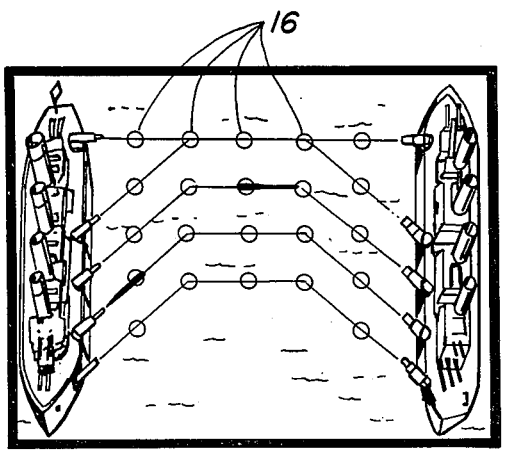
FIG._8A.
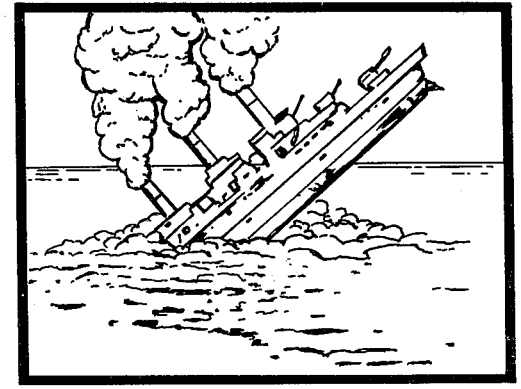
FIG._8B.

ELECTRONIC GAME APPARATUS USING A THREE-DIMENSIONAL IMAGE

BACKGROUND OF THE INVENTION

1. Field of the Invention

This invention relates to electronic games, and in particular to an electronic game in which a three dimensional image is used during play of the game.

2. Prior Art

Numerous types of electronic games utilizing a variety of display devices are known. In general, however, such electronic games may be divided into two broad catagories according to the type of display used. A first type uses a cathode ray tube or a television monitor to display a two-dimensional representation of the game being played. Such games have evolved from simple single function devices for black and white image reproduction of a single game to substantially more complicated programmable games in which various games may be played in color. For example, in one programmable electronic game using a television monitor as a display, a user may select the game to be played by inserting a cartridge or similar unit into a base unit which contains a microprocessor. The cartridge or other unit usually contains one or more semiconductor read only memory integrated circuits in which the game to be played is stored as a computer program. Insertion of the cartridge into the base reconfigures the microprocessor in the base to play the particular game represented by the computer program. United States patents describing the microprocessor apparatus include U.S. Pat. No. 4,112,422 entitled "Method and Apparatus for Generating Moving Objects on a Video Display Screen" by S. T. Mayer and R. E. Milner. A typical read only memory cartridge is shown in U.S. Pat. No. 4,149,027 entitled "TV Game Cartridge and Method" by J. C. Asher and D. A. Hardy.

A second type of electronic game utilizes individually energizable display elements such as light emitting diodes or liquid crystal displays. In this type of game the individual display element by being on or off conveys information as the game is played. For example, the on or off condition may indicate a correct or incorrect guess, the position of a player on a game board, or other information.

SUMMARY OF THE INVENTION

This invention provides an electronic game playing apparatus using a three-dimensional display. In one embodiment, the apparatus comprises a base including an opening which serves as a viewing window, at least one three-dimensional image stored on an arbitrarily shaped plate, illumination means for illuminating the plate to enable viewing of a three-dimensional image through the opening, at least one display element positioned to be viewable in conjunction with the three-dimensional image, and game playing means for controlling the at least one display element. In other embodiments, no display elements are provided and the game playing means controls illumination of the at least one three-dimensional image.

Typically the base encompasses a closed volume to allow selective illumination of the plate containing the at least one three-dimensional image. The three-dimensional image may be stored on the plate using, for example, known holographic techniques. According to one such technique the three-dimensional image is produced by wave front reconstruction. In such an embodiment the image is stored on a photographic plate by using lasers to record the diffraction pattern from a three-dimensional object. A plate containing an image stored in this manner is referred to herein as a hologram.

In some embodiments of the invention, one or more display elements, for example, light emitting diodes, are positioned behind the plate relative to the opening in the base to enable viewing the display elements through the plate, and therefore through the three-dimensional image. Typically the electronic game apparatus will include some type of player input means, for example, push buttons or a joystick, for enabling the player of the game to supply input signals to the one or more display elements and the game playing means. A microcomputer may be used to detect the input signals from the player and supply appropriate signals to the display elements and to other game apparatus. In other embodiments of the invention, the three-dimensional image produced by illuminating the plate may be viewed in conjunction with a "dead front" or other type of graphic display which provides context to the on or off condition of the one or more display elements.

In some embodiments of the invention the plate and other electronic apparatus are stored in a cartridge to allow a plurality of games to be played with a single base unit. In such embodiments the base may contain the display elements, the game play computer, an illuminating lamp, power supply, and other components common to all games to be played by the unit, for example, a tone generator.

In further embodiments of the invention a reflective coating may be employed on the plate on which the three-dimensional image is stored. By use of a partially reflective coating, the holographic image may be brightened and the one or more display elements, graphic display, or other material may be obscured when the display elements are off. Similarly, in some embodiments the display elements may be positioned away from the plate yet made to appear in the desired location by the reflective coating.

In another embodiment of the invention the plate comprises a hologram on which a plurality of images have been stored which may be individually accessed by illumination sources placed at various angles to the hologram. In this manner, play of an individual game may include a plurality of three-dimensional images which are individually displayed depending upon the sequence or outcome of the game.

BRIEF DESCRIPTION OF THE DRAWINGS

FIG. 1 is an exploded view of the base unit of one embodiment of the invention.

FIG. 2 is an exploded view of a cartridge containing a hologram adapted for use with the base unit shown in FIG. 1.

FIG. 3 is a more detailed perspective view of the lamp holder shown in FIG. 1.

FIG. 4 is a cross-sectional view of one embodiment of the invention in which two sources of illumination are used to access different images stored on a single hologram.

FIG. 5 is a cross-sectional view showing a different arrangement of two illumination sources for accessing different images on a single plate.

FIG. 6 is a cross-sectional view of one embodiment of the invention in which a beam splitter is used to combine a hologram with light from individual display elements.

FIG. 7 is a cross-sectional view showing an embodiment of the invention in which a reflective coating is used on a hologram.

FIG. 8 depicts schematically one game using multiple holographic images.

FIG. 9 is a block diagram of the electronic components of one embodiment of the invention.

DETAILED DESCRIPTION

An exploded view of the components of the base 10 of one embodiment of the electronic game apparatus using three-dimensional images is shown in FIG. 1. The base 10 includes a lower assembly 12 in which a first printed circuit board 15 is positioned. Printed circuit board 15 includes an array of light emitting diodes 16 in a desired arrangement. On another portion of printed circuit board 15, or on a separate circuit board 18, electronic components are affixed. Such components are described in conjunction with FIG. 9, however, as depicted in FIG. 1 board 18 includes a microcomputer 20 and a tone generator 22. Both are typically integrated circuits encased within one or more dual in-line packages. A graphic display, often known as a "deadfront graphic overlay," may be printed or otherwise affixed to the surface of board 15. In other embodiments the graphic display may be a part of the cartridge (shown in FIG. 2).

A lamp assembly 25 including one or more lamps 27 and 28 is adapted to fit into the bottom of the lower assembly 12. A speaker 29 may also be included to convert the output signals from tone generator 22 to audible sound. A suitably shaped upper cover 32 of the base is adapted to connect to lower assembly 12. The combination of assembly 12 and cover 32 creates a darkened volume within assembly 12 and cover 32 in which three-dimensional images may be viewed. The cover 32 includes a transparent window 34 used to prevent dust or moisture from reaching circuit boards 15 and 18 through opening 36. The window 34 also prevents contact between the game player and the electronic components. A keyboard 38 is adapted to fit within a recessed region 39 of the upper cover 32. An appropriately designed fairing 40 is used to contain keyboard 38 in recess 39 and provide a finished appearance for the edge of cover 32. A slot 17 or other opening is provided at a convenient location in lower assembly 12. Depending upon the design of the assembly 12 and cover 32 the slot 17 may be located in any convenient position. A suitably designed cartridge containing a plate on which a three-dimensional image is stored may be inserted between the lower assembly 12 and upper cover 32 through slot 17. This cartridge is discussed in conjunction with FIG. 2.

Once the cartridge is inserted and illuminated, an individual playing the electronic game apparatus may view the three-dimensional image reconstructed in the interior of the base unit 10. Depending upon which portions of the cartridge placed in slot 17 are opaque, some of the light emitting diodes 16 on board 15 also may be visible through opening 36. This feature allows different games to be played without changing the hardware or software of the game. The player may then play the electronic game by activating the appropriate keys on keyboard 38 to supply signals to microcomputer 20 and light emitting diodes 16. In response to these signals, microcomputer 20 may also control light emitting diodes 16 on board 15. In addition, in some embodiments of the invention, microcomputer 20 will control the lights 27 and 28 which illuminate the hologram, the tone generator 22 or other devices.

An exploded view of the cartridge 14 having a plate 47 on which the three-dimensional image is stored is shown in FIG. 2. The cartridge is given an overall designation 14. In one embodiment, the cartridge includes a lower housing 42 and an upper housing 43. Cartridge 14 includes openings 44 and 45 of appropriate size and shape to permit one or more of the display elements 16 to be viewed through the cartridge 14 and to permit projection of the image from plate 47. Plate 47 will typically be a hologram crated in a known manner, however, other techniques may be used for storing the image. See, for example, "Three-Dimensional Displays" by T. Okoshi, Proceedings of the IEEE, Volume 68, No. 5, May, 1980, page 548.

The quality of the image produced by the hologram or plate 47 may be enhanced by embossing or roughening the back surface of the plate 47. This roughening causes the plate 47 to reflect more of the incident light from the lamp assembly 25 to the game player. The image quality may be further enhanced, in embodiments where nothing is behind the hologram 47, by adding a reflective coating to the back surface of plate 47 to further increase the reflectivity.

In some embodiments, the cartridge 14 may also include a deadfront graphic overlay or graphic display 48. Graphic display 48 typically comprises a transparent material on which one or more designs are printed or otherwise attached. Openings in the designs are left where desired ones of light emitting diodes 16 on board 15 are to be viewed. Display 48 provides a context for the game player to interpret the on or off condition of each display element 16. The graphic display 48 may be imprinted, die-cut, or otherwise fabricated in an array which causes desired display elements 16 to be seen by the viewer in a form related to the holographic image. Further, one or more of the display elements may be obscured by the graphic display 48 to preclude sight of that element by the game player, even though the element may be illuminated. In this manner, play of the game may be altered without changing the software in microcomputer 20.

Cartridge 14 permits the base assembly shown in FIG. 1 to be used in conjunction with more than one game, and in particular, with more than one hologram 47. Cartridge 14 includes means 49 for communicating to the base unit the identity of the cartridge inserted into slot 17. For the embodiment shown in FIG. 2, means 49 includes the presence of four electrically conductive tabs to short circuit a known connector assembly (not shown) in the base in FIG. 1. Other known coding or identification techniques may also be used, for example, an array of electromechanical switches or an encoded cam. Finally, to identify the cartridge 14 to the game player, a label 52 may be affixed to the exterior of housing 43 or 42 providing game play instructions and identifying the cartridge 14.

For the embodiment shown in FIGS. 1 and 2, a nonopaque hologram 47 is positioned in front of an array of light emitting diodes 16. Other known illuminating devices may also be used, for example, small neon bulbs. When on, interactive display of illuminating devices 16 is seen by the player as combined or superimposed with the holographic image projected in the interior of base 10 from plate 47 by light 27 or 28. Play of the game between the game player and the microcomputer 20 is indicated by illumination of the display light sources 16 under computer and/or player control. Depending upon the game being played, the computer program for microcomputer 20 may be structured to recognize the holographic image as providing an obstacle for the player to avoid, a lane in which to travel, a target, an objective, general background information, a combination of the foregoing, or as other information.

In other embodiments of the invention, a liquid crystal display or other known display device may be employed in place of or in combination with illuminating devices 16. In yet other embodiments, a liquid crystal display may be located between the game player and the holographic plate or between the display device and the holographic plate to control the game player's visual access to the holographic image and/or display device.

FIG. 3 is a more detailed perspective view of the lamp support 25. Support 25 is adapted to fit into the bottom of the lower assembly 12 of the base unit shown in FIG. 1. Support 25 simplifies replacing lamps 27 and 28, and permits accurate control over their position with respect to hologram 47. In an embodiment of the electronic game in which the hologram comprises only a single three-dimensional image, only one of lamps 27 and 28 will be used. In other embodiments in which the hologram contains more than one image, a single lamp is required to project each image. Each of lamps 27 and 28 may include a reflector 54 to focus and concentrate the light from the lamp and redirect the light toward plate 47. As shown in FIG. 3A, the base 55 of reflector 54 may be suitably shaped to permit it to lock into the overall lamp support structure 25. In this manner the lamps 27 and 28 may be readily replaced. Conductive strips or wires 56 may be attached to support 25 to connect the lamps 27 and 28 to a series of connectors 58 for turning the lamps off and on. Connectors 58 are adapted to connect to similar regions on the interior of the lower portion 12 of the base 10.

A cross-sectional view of one embodiment of the apparatus of this invention adapted for use with a hologram containing two three-dimensional images is shown in FIG. 4. The base 12, upper portion 32 and fairing 40 are fitted together as shown, and as also depicted in FIG. 1. Cartridge 14 is shown in position in the lower assembly 12 of the base 10. In the embodiment depicted, hologram 47 is positioned at a 55° angle to the horizontal. Lamp 28 is positioned 7.00 inches outward along a horizontal line extending from the center line of hologram 47. This distance is measured from the center of the filament to the diagonal center of the front surface of the hologram. The game player views the hologram at a 35° angle above horizontal and therefore perpendicularly to the hologram surface. The other lamp 27 is positioned at a 60° angle down from the viewing axis 33. The filament center line to hologram distance for lamp 27 is 4.62 inches. These distances and angles are not critical to all embodiments of the game apparatus of this invention, but will vary from embodiment to embodiment depending upon the characteristics of the hologram. Holograms may be manufactured for use with different angles of illumination, although the dimensions and angles depicted in FIG. 4 are typical.

A side view of lamp 27 is shown in the lower portion of FIG. 4. We have discovered that if an incoherent light source, such as incandescent lamp 27, is used, the quality of the holographic image may be improved by positioning the lamp in the manner depicted. As shown in FIG. 4A, lamp 27 is positioned with the taller filament support 60 positioned closer to mirror 54 than the shorter filament support 61. This prevents the filament 62 from casting a shadow of support 60 on hologram 47. In this manner, an end view of the filament 62 is projected by mirror 54 onto hologram 47. The hologram "sees" the view of the lamp filament illustrated by arrow 64 in FIG. 4A. For the type of light bulb 27 and 28 depicted in FIG. 4, a spherical mirror of 1 inch diameter and 0.625 inch aperture has been found suitable for reflecting light onto the hologram 47.

FIG. 5 depicts an alternative lamp arrangement to that shown in FIG. 4. In the embodiment shown, both the hologram 47 and the circuit board 15 containing the display elements 16 are mounted in cartridge 14. As also shown, lamp 27 is positioned at a 60° angle below the viewing axis 33 while lamp 28 is positioned at a 40° angle above the axis 33. Illumination of one of the two lamps will cause one of the two images stored on the hologram 47 to be projected. Play of the game is controlled by a keyboard 38. In the embodiment depicted, the filaments 62 of lamps 27 and 28 are positioned with their longitudinal axis parallel to the surface of the hologram 47.

The quality of the reconstructed image is best if the two bulbs 27 and 28 are positioned along the same line of sight or reflected line of sight with respect to the game player's eyes. Of course, the difference between the angles bulb 27 and bulb 28 make with respect to the hologram 47 must be sufficient to prevent one bulb from reconstructing the image of the other bulb. In practice a difference of at least 20° has been found sufficient. Typically one bulb will be positioned at an angle with respect to the hologram 47 of between 25° and 45° with the other bulk positioned between 45° and 70°, while maintaining at least 20° difference.

One embodiment of a single image holographic game apparatus is shown in FIG. 6. In the embodiment shown, a half silvered mirror 70 is used to combine the image projected by the hologram 47 and the display elements 16 (mounted on board 15). A graphic overlay 48 may be positioned in front of the display elements 16. The holographic image is created by lamp 27 reflecting light onto mirror 71 to strike the back side of hologram 47. Appropriate shading structure 73 is used to prevent lamp 27 illuminating hologram 47 from more than one angular position.

FIG. 7 is a cross-sectional view of an embodiment in which a reflective coating 75 is applied to the rear surface of the hologram 47. In the embodiment shown, a light source 27 illuminates the hologram 47 to reconstruct an image in the interior of base 12. The image is viewable through opening 36. The light emitting diodes 16 or other display elements are mounted on a printed circuit board 15, which has a keyboard 38 on its opposite side. The silvered surface 75 of hologram 47 reflects the light emitting diodes 16 into the three-dimensional image reconstructed by lamp 27. Therefore, the combined image and display elements are visible through opening 36.

The reflecting coating 75 brightens the holographic image and obscures portions of the base 12 behind hologram 47. In other embodiments of the invention, light emitting diodes 16, or other display devices, may be positioned behind hologram 47 and silvering material 75 may be selectively applied to the hologram 47 to permit viewing of some display elements 16 through the hologram. In this manner display elements common to all games may be positioned on the back surface of keyboard 38, while additional display elements required for a particular game may be included within cartridge 14.

FIG. 8 is a schematic depiction of one type of game which may be played with the apparatus depicted in any embodiment depicted in the Figures which permits more than one image on the hologram. As shown in FIG. 8A, a holographic image of two battleships side by side is initially seen through opening 36. During play of the game, activation of keyboard 38 causes illumination of selected ones of light emitting diodes 16, also viewable through opening 36. Sequential illumination of light emitting diodes 16 is used to depict an artillery shell traveling from one battleship to the other. In one embodiment the game player controls one battleship while the microcomputer 20 controls the other. Depending upon the timing and artillery selection of the player, either the ship the player controls will "sink" the other ship or will "be sunk" by the other ship. When this happens, the three-dimensional image of FIG. 8B will be projected to show the sinking ship. The tone generator 22 may be used to play two different short melodies to reflect which ship has been sunk.

FIG. 9 is a block diagram showing a typical known electronic apparatus for use with the holographic game of this invention. As shown in FIG. 9, microcomputer 20 includes a memory in which the game playing program is stored. The computer receives power from a power supply 78 typically batteries or an AC/DC converter. The computer is also connected to receive input signals from player controls 38 which may be any well known control devices, for example, a keyboard, one or more pushbuttons, or a joystick. In certain games, the player controls may also control the illumination of the hologram by controlling light sources 27 and 28. These embodiments are indicated by the dashed line 79 in FIG. 9. In response to the player inputs, and in conjunction with the game program, the computer 20 may control the illumination of the hologram and the display elements 16. In some embodiments the computer also controls a tone generator 22 which drives a speaker 29 to provide sound during play of the game.

Although the invention has been described with reference to several specific embodiments, the description is intended to be illustrative of the invention and not to be construed as limiting the invention. Various modifications and applications will occur to those skilled in the art without departing from the spirit and scope of the invention as defined by the appended claims.

What is claimed is:

1. Electronic game apparatus comprising: a base including an opening;
   a three-dimensional image stored on a plate;
   illumination means for angularly illuminating the plate to enable viewing of the three-dimensional image through the opening;
   a plurality of display elements positioned to be viewable in conjunction with the three-dimensional image;
   a graphic overlay positioned in an optical path between the plurality of display elements and the opening for visually defining the game meaning of the display elements; and
   game playing means for controlling the plurality of display elements.

2. Apparatus as in claim 1 wherein the plurality of display elements are positioned behind the plate relative to the opening and can be viewed through the plate.

3. Apparatus as in claim 1 wherein the plurality of display elements comprise light emitting diodes.

4. Apparatus as in claim 1 wherein the plurality of display elements comprise a liquid crystal display.

5. Apparatus as in claim 1 wherein the three-dimensional image stored on a plate is a hologram.

6. Apparatus as in claim 5 wherein the illumination means comprises a light source.

7. Apparatus as in claim 6 wherein the illumination means includes a mirror for reflecting light from the light source onto the hologram.

8. Apparatus as in claim 7 wherein the mirror is curved.

9. Apparatus as in claim 8 wherein the light source includes a filament and the light source is positioned relative to the mirror and hologram to project the filament as substantially a point source of light.

10. Apparatus as in claim 1 wherein a transparent window covers the opening in the base.

11. Apparatus as in claim 1 wherein the game playing means comprises:
    player input means for enabling a player to generate input signals; and
    computer means for detecting the input signals from the player input means and supplying control signals to the plurality of display elements.

12. Apparatus as in claim 11 wherein the player input means comprises at least one switch.

13. Apparatus as in claim 11 wherein the player input means comprises a keyboard.

14. Apparatus as in claim 11 wherein the computer means comprises a microcomputer.

15. Apparatus as in claim 1 wherein the graphic overlay is positioned between the plate and the plurality of display elements.

16. Apparatus as in claim 15 wherein the graphic overlay allows selected ones of the plurality of display elements to be viewed through the plate.

17. Apparatus as in claim 1 wherein the plate is disposed in a cartridge removable from the base.

18. Apparatus as in claim 17 wherein the game playing means are in the cartridge.

19. A game display cartridge adapted for use with an electronic game apparatus, the electronic game apparatus including a base having an opening, illumination means for illuminating the game display cartridge, and at least one display element positioned to be viewable in conjunction with the game display cartridge, the game display cartridge comprising:
    a case; and
    a three-dimensional image stored on a plate in the case, whereby insertion of the game display cartridge into the base angularly disposes the illumination means to the plate to permit viewing of the three-dimensional image.

20. Apparatus as in claim 19 wherein:
    the base further includes game playing means for controlling the at least one display element; and
    the cartridge further includes identification means for connecting to the game playing means.

21. Apparatus as in claim 19 wherein the cartridge further includes a graphic display positioned to be viewable with the three-dimensional image.

22. Apparatus as in claim 19 wherein the case is a frame shaped member;

the plate is positioned to be surrounded by the frame shaped member; and the cartridge is inserted into the base between the opening and the at least one display element.

23. Apparatus as in claim 22 wherein the three-dimensional image stored on the plate is a hologram.

24. Apparatus as in claim 19 wherein the three-dimensional image is stored on one surface of the plate and a reflective coating is formed on a second surface of the plate which enables the at least one display element to be viewed in conjunction with the three-dimensional image when the cartridge is inserted into the base.

25. Apparatus as in claim 24 wherein the game apparatus has a plurality of display elements, and wherein the reflective coating is arranged on the second surface to selectively enable only some of the plurality of display elements to be viewed in conjunction with the three-dimensional image.

26. Electronic game apparatus comprising:
a base including an opening;
a three-dimensional image stored on a plate as a hologram;
illumination means for angularly illuminating the plate to enable viewing of the three-dimensional image through the opening; and
game playing means for controlling the illumination means.

27. Apparatus as in claim 26 wherein the illumination means comprises a light source.

28. Electronic display apparatus comprising:
means for storing a diffraction grating oriented to provide a holographic image visible from a viewing position in response to illumination from a first position;
illumination means for illuminating the diffraction grating from the first position;
a manually operable control for providing control signals in response to manual operations;
control means coupled to the manually operable control for providing select signals in response to control signals;
display means coupled to the control means for receiving the select signals and providing a visual display visible from the viewing position which varies in response to control signals.
wherein the visual display is visible along the same line-of-sight as the holgraphic image and is superimposed on the holographic image by a partially reflective combining mirror.

29. Electronic display apparatus as in claim 28 wherein the means for storing the diffraction grating comprises plate having the diffraction grating superimposed on a first surface.

30. Electronic display apparatus as in claim 28 wherein the display means comprises a plurality of selectively visible display elements.

31. Electronic display apparatus as in claim 28 wherein the partially reflective combining mirror is formed on the rear surface of the plate.

32. Electronic display apparatus as in claim 31 wherein the display means comprises a plurality of selectively visible display elements, and wherein the partially reflective combining mirror formed on the rear surface of the plate is arranged to reflect only some of the plurality of visible display elements along the common line-of-sight.

33. Electronic display apparatus comprising:
means for storing a diffraction grating oriented to provide a holographic image visible from a viewing position in response to illumination from a first position;
illumination means for illuminating the diffraction grating from the first position wherein the illumintion means comprises an incandescent light bulb having a filament oiented to present a substantially point source to the plate and a spherical mirror oriented to reflect light onto the plate from a light bulb;
a manually operable control for providing control signals in response to manual operations;
control means coupled to the manually operable control for providing select signals in response to control signals;
display means coupled to the control means for receiving the select signals and providing a visual display visible from the viewing position which varies in response to control signals,
wherein the visual display is visible along the same line-of-sight as the holographic image and is superimposed on the holographic image.

34. Electronic display apparatus as in claim 33 wherein the display means comprises a plurality of selectively visible display elements and further comprising graphic display means positioned in an optical path between the viewing position and the display means and having a plurality of transmissive apertures, each aperture aligned with a different one of said plurality of display elements, for visually defining the display elements.

35. Electronic display apparatus as in claim 34 wherein the graphic display means is positioned between the storing means and the display means and is attached to one face of the storing means.

36. Electronic display apparatus comprising:
means for storing a diffraction grating oriented to provide a holographic image visible from a viewing position in response to illumination from a first position;
illumination means for illuminating the diffraction grating from the first position;
a manually operable control for providing control signals in response to manual operations;
control means coupled to the manually operable control for providing select signals in response to control signals; and
display means coupled to the control means for receiving the select signals and providing a visual display visible from the viewing position which varies in response to control signals,
wherein the storing means further comprises keying means which engages with the control means in response to alignment of the storing means with the illumination means and display means for providing identification signals to the control means, the control means selecting a visual display in response to identification signals.

37. A holographic plate adapted for use with electronic display apparatus having illumination means for providing light from a light source, a plurality of selectively visible display elements visible from a view position, and control means coupled to the display elements for selecting the visible display elements, the holographic plate comprising:
a diffraction grating oriented to provide a holographic image visible from the viewing position in response to illumination from a first angular position with respect to the illumination means; and graphic display means having a plurality of transmissive apertures attached to the plate on the surface to be positioned toward the display elements, each aperture aligned with a different one of the display elements when the plate is positioned to align the first angular position and the light source for visually defining the display elements.

38. A holographic plate as in claim 37 wherein the diffraction grating is superimposed on a surface of the plate.

39. A holographic plate as in claims 37 and 38 further comprising keying means attached to the plate for providing an identification signal to the control means in response to alignment of the plate with the illumination means and display means, the control means selecting a set of display elements in response to the identification signal.

* * * * *